(12) United States Patent
Van Doorselaer et al.

(10) Patent No.: US 6,226,519 B1
(45) Date of Patent: *May 1, 2001

(54) SERVICE OF A TELECOMMUNICATION SYSTEM AND SERVICE DEVICE REALIZING SUCH A SERVICE

(75) Inventors: Bart Alfons Peter Van Doorselaer, Gent; Michel Diane Cyriel Van Ackere, Sint Niklaas, both of (BE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,138

(22) Filed: Feb. 17, 1998

(30) Foreign Application Priority Data

Feb. 21, 1997 (EP) .................................................. 97400391

(51) Int. Cl.[7] ...................................................... H04Q 7/32
(52) U.S. Cl. ........................ 455/450; 455/445; 455/509; 379/139
(58) Field of Search ................................... 455/414, 417, 455/403, 422, 445, 458, 517, 450, 451, 452, 509, 511; 379/89, 207, 211, 210, 216, 201, 90.01, 91.01, 92.01, 137, 111, 139

(56) References Cited

U.S. PATENT DOCUMENTS

| | | |
|---|---|---|
| 5,440,541 | 8/1995 | Iida et al. ............................. 370/60.1 |
| 5,459,775 * | 10/1995 | Isono et al. ........................ 379/93.15 |
| 5,550,907 | 8/1996 | Carlsen ................................. 379/207 |
| 5,581,611 * | 12/1996 | Yunoki .................................. 379/211 |
| 5,594,722 | 1/1997 | Iida et al. ............................. 370/426 |
| 5,682,601 * | 10/1997 | Sasuta .................................. 455/422 |
| 5,710,884 * | 1/1998 | Dedrick ................................ 709/217 |
| 5,812,948 * | 9/1998 | Hjern et al. .......................... 455/411 |
| 5,852,781 * | 12/1998 | Ahvenainen ......................... 455/509 |
| 5,884,161 * | 3/1999 | Hegeman ............................. 455/458 |
| 6,047,187 * | 4/2000 | Haartsen .............................. 455/509 |

FOREIGN PATENT DOCUMENTS 0719059    12/1995    (EP) .

OTHER PUBLICATIONS

"Evolving an Intelligent Architecture for Personal Telecommunication", L. Soderberg, *Ericsson Review* No. 4, 1993, pp. 156–171.

"Universal Personal Telecommunication (UPT) —Concept and Standardisation", J. Sundborg, *Ericsson Review*, No. 4, 1993, pp. 140–155.

"Personal Communication Services—The New Pots", J. Regnier et al, Globecom '90, IEEE Global Telecommunications Conf. and Exhibition, San Diego CA Dec. 2–5, 1990, Conference Record, vol. 1, pp. 0420–0426.

Applicability of OSI Directory to Universal Personal Telecommunication (UPT) , S. Obana et al, *Electronics and Communications in Japan*, Part I: Communications, vol. 75 (1992), Oct., No. 10, New York, pp. 1–14.

"Modeling and Formal Specification of the Personal Communication Service", D. Desbiens et al, *Proceedings of the IEEE Infocom '93*, vol. 2, pp. 756–765.

* cited by examiner

*Primary Examiner*—Nay Maung
*Assistant Examiner*—Jean Alland Gelin

(57) ABSTRACT

A service of a telecommunication system which is delivered upon receiving of a communication request (REQ) of an originating user (A). The communication request (REQ) is generated at a first terminal (T1-A1) of the originating user (A) and includes an identification of a terminating user (B). The service includes the steps of retrieving and comparing a request profile of the originating user and a reachability profile of the terminating user. Following the results of the comparing the service can further include any or both of the steps of: a) according to a result of the comparing, establishing a communication between a second terminal (T2-A) of the originating user and first terminal (T2-B) of the terminating user; and b) generating and providing information of the result to a third terminal (T1-A) of the originating user.

16 Claims, 1 Drawing Sheet

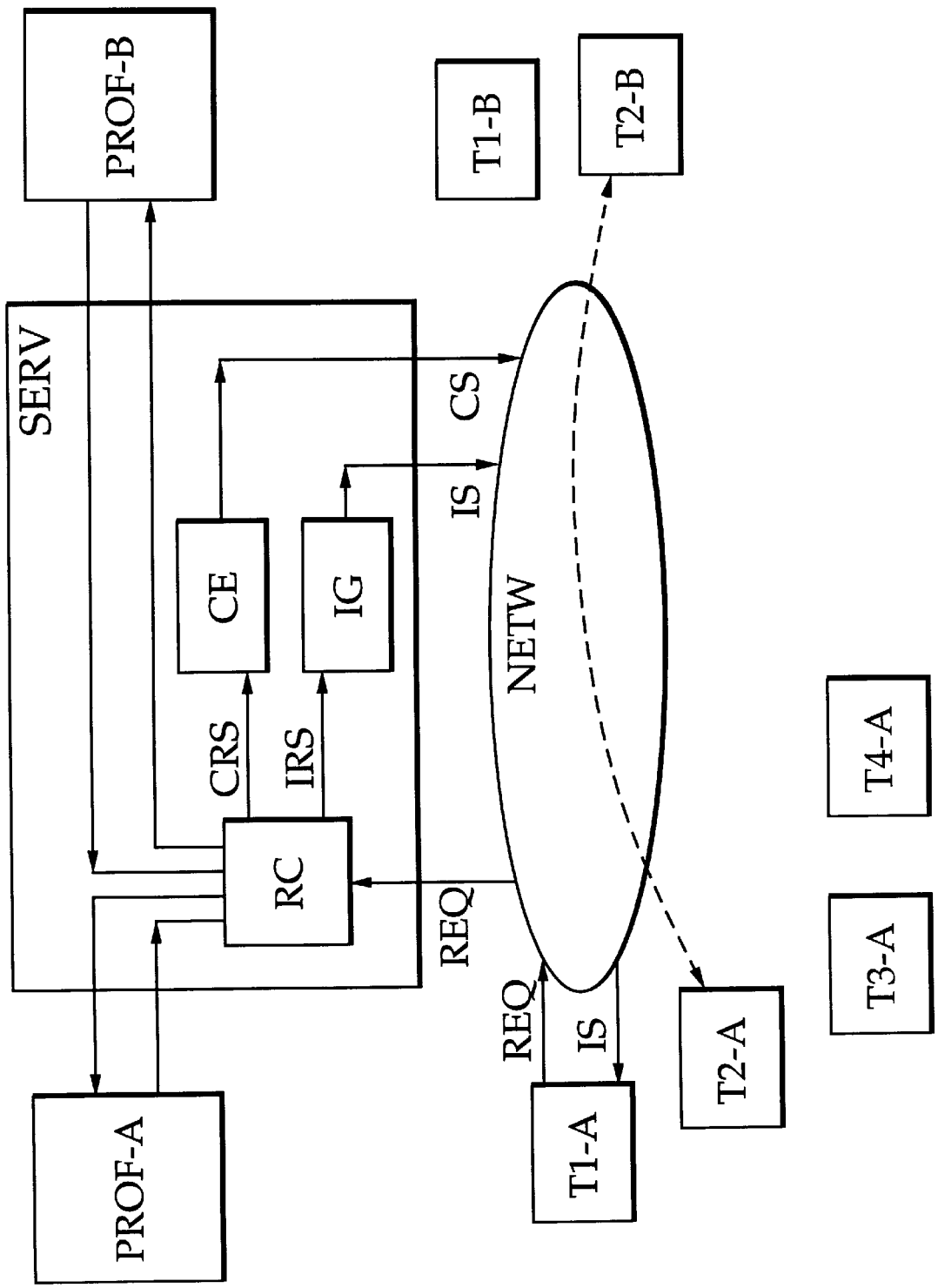

SERVICE OF A TELECOMMUNICATION SYSTEM AND SERVICE DEVICE REALIZING SUCH A SERVICE

BACKGROUND OF THE INVENTION

1. Technical Field

The present invention relates to a service of a telecommunication system and a service device included in a telecommunication system realizing such a service, and a telecommunication system including such a service device.

2. Discussion of Related Art

Such a telecommunication system supporting such a service is already known in the art, e.g. from the articles 'Universal Personal Telecommunication (UPT)—Concept and Standardisation' of Jonas Sundborg and 'Evolving an Intelligent Architecture for Personal Telecommunication' of Lennart Söderberg, published in Ericsson Review number 4 in 1993, respectively from pages 140 to 155 and from pages 156 to 171 thereof.

As described on page 142 thereof universal personal telecommunication UPT enables access to telecommunication services while allowing personal mobility. It enables each UPT user to participate in a user-defined set of subscribed services and to initiate and receive a call on the basis of a personal, network-transparent UPT number across multiple networks on any fixed or mobile terminal, irrespective of geographical location, limited only by terminal and network capabilities and restrictions imposed by the network operator. A call to UPT users may also be made by non-UPT user. A universal telecommunication service will allow access from multiple networks and provide terminal independence. In principle, a UPT user may use any terminal for making and receiving UPT calls—provided that the terminal is capable of supporting the requested services. The UPT service may be accessed by UPT users across multiple networks; for example, Public Switched Telephone Network PSTN, Integrated Service Digital Network ISDN and Public Data Network PDN. Another dimension is operation over private telecommunication networks PTNs, interworking with the public network.

In particular, on page 158 of the above mentioned articles a list of user requirements in an universal personal telecommunication UPT network is described. On of the requirements is that the user wants to be able to communicate with selected persons only, which implies the ability to manage personal directories for both originating and terminating calls and to specify how each entry is to be treated.

Page 148 describes a "variable default Incall registration" which enables the UPT user to set up a default registration matrix of terminal addresses for incoming UPT calls, so that incoming UPT calls can be routed and handled differently according to time of the day, day of the week, calling party's identity, type of service, the number dialled, and according to 'on no answer' or 'on busy' conditions, as appropriate. A UPT user can modify his or her own matrix so that it fits e.g. to his or her regular travel routing or time schedule.

An obvious way to realize a service of a telecommunication network which is delivered upon receiving of a communication request of an originating user, is for instance a sequence of steps to:

check whether the originating user is allowed to make a call;

set up a connection from the originating user to the terminating user; and check whether the terminating user is willing to accept the call, wants to forward it to another destination or reject the call.

A result of such a service is that depending on the contents of the personal directory of the originating user the communication request is dropped or later on depending on, the contents of the registration matrix of the terminating user, either the connection which is set up is completed and established or the connection which is set up is dropped.

However, a problem outstanding with this service is that in the event when the connection set up is dropped, bandwidth is temporarily allocated for a connection that will never be completed. Consequently, the network resources are not used in an optimal way.

SUMMARY OF THE INVENTION

An object of the present invention is to provide a service of a telecommunication network which is delivered upon a communication request, such as the above known one, but which has not the above drawback of temporarily allocating bandwidth for a connection that will never be completed.

According to a first aspect of the present invention, a service supported within a telecommunication system which is delivered upon receiving a communication request of an originating user, said communication request being generated at a first terminal of said originating user and including an identification of a terminating user, is characterized in that said service includes retrieving and comparing a request profile of the originating user and reachability profile of the terminating user.

The service according to the first aspect of the present invention is further characterized in that the service further includes any or both of the steps of: (a) according to a result of said comparing, establishing a communication between a second terminal of the originating user and a first terminal of the terminating user, and (b) generating and providing information of the result to a third terminal of the originating user or to a second terminal of the terminating user. The comparison can be performed by other terminals, such as by a fourth terminal of the originating user or a third terminal of the terminating user. Or, the comparing can be performed by comparing means included in a telecommunication network which is included in the telecommunication system. Such a telecommunication system could be a universal personal telecommunication network, and the request profile and the reachability profile would therefore include universal personal telecommunication features.

The service according to the first aspect of the present invention is characterized in that the service further includes the step of generating and providing information of the result to a fifth terminal of the originating user in order to tune the request profile to the reachability profile.

The service according to the first aspect of the present invention is further characterized in that it includes the step of generating and providing information of the result to a sixth terminal of the originating user in order to design a common request profile and a common reachability profile.

According to a second aspect of the present invention, a service device included in a telecommunication system for delivering a service within the telecommunication system upon receipt of a communication request of an originating user, the communication request being generated at a first terminal of the originating user and being provided via a telecommunication network to the service device, the first terminal and the telecommunication network being included in the telecommunication system and the communication request including an identification of a terminating user, is characterized in that the service device includes retrieving and comparing means for retrieving and comparing a request profile of the originating user and a reachability profile of the terminating user.

The service device according to the second aspect of the present invention is further characterized in that the service device further includes communication establishing means included to generate a call signal upon receipt of a call result signal of the retrieving and comparing means, the call signal being provided to call setup means included in the telecommunication network in order to establish a communication according to the call result signal between a second terminal of the originating user and first terminal of the terminating user via the telecommunication network, the second terminal of the originating user and the first terminal of the terminating user being included in the telecommunication system.

In further accord with the second aspect of the present invention, the service device is further characterized in that it further includes information generating means for generating an information signal upon receipt of an information result signal of the retrieving and comparing means, the information signal being provided to information receiving means included in a third terminal of the originating user, which is included in the telecommunication system and coupled to the telecommunication network.

The service device of the second aspect of the present invention is further characterized in that it is included in a fourth terminal of the originating user, the fourth terminal of the originating user being included in the telecommunication system and being coupled to the telecommunication network.

In still further accord with the second aspect of the present invention, the service device is included in a second terminal of the terminating user, which terminal is included in the telecommunication system and is coupled to the telecommunication network.

The service device according to the second aspect of the present invention is further characterized in that the service device may be included in the telecommunication network. Such a network can be a universal personal telecommunication network and the request and reachability profiles include universal personal telecommunication features.

According to a third aspect of the present invention, a telecommunication system is characterized in that it includes at least one service device according to the second aspect of the present invention.

Indeed, by including in the service of the invention the steps of retrieving and comparing a request profile of the originating user and a reachability profile of the terminating user, no bandwidth is allocated for a connection that will never be completed since these two steps are realized prior to connection set up.

In a simplified embodiment of the service of the invention a request profile of an originating user can be a personal directory of an originating user as described above but is not necessarily limited to such a personal directory and also a reachability profile of a terminating user can be a registration matrix of a terminating user as described above but is not necessarily limited to such a registration matrix.

A request profile and a reachability profile of a user are information packets which are reflective of the preferences of the user for originating communications and terminating communications. These profiles are described more in detail in a further paragraph.

The results of the service of the invention can be used to realize any or both of the following steps:

establishing a communication between the originating user and the terminating user according to the result of the comparing; and generating and providing information of a result of said comparing to the originating user.

It has to be remarked that when a result of the invention is e.g. the establishing of a particular communication between the originating user and the terminating user but e.g. the terminating user is busy, a call establishment reservation can be made in order to realize the step of "establishing a communication" later on. So, the establishing and generating steps described in the previous paragraph don't have to be realized immediately after comparing of the user profiles and neither do these steps have to be realized at the same time in the event when both are to be accomplished.

Another remark is that although the service of the invention is delivered upon receiving a communication request of an originating user, the results don't have to be used necessarily with the purpose of a communication establishment. This means that e.g. an originating user can use the service of the invention to tune his request profile to a reachability profile of a predetermined terminating user or e.g. an operator of the telecommunication system can use the service of the invention with the intention to make statistics or with the purpose to design a common request profile and a common reachability profile.

It also has to be remarked that a connection which is established following the service of the invention reflects the user preferences since the request profile of the originating user and the reachability profile of the terminating user are checked during the procedure and even more they are compared with each other in order to define the most suitable communication for both, originating and terminating user. Not only the terminating user but also the originating user gets the possibility to dictate how his communication request is to be treated. Indeed, after his communication request and after the step of retrieving and comparing of the profiles and in the event when the results of the comparing shows no perfect matching of the requirements of both users, the originating user receives a feedback i.e. information of the result of the service device and has the opportunity to tune his requirements or to end his communication request.

Yet, another remark is that although a first, a second, a third, a fifth and a sixth terminal of the originating user and, as it will be seen further on also a fourth terminal of the originating user are mentioned, it will be evident to any person skilled in the art that the invention is not restricted to different terminals of the originating user to realize the different steps. In a simple implementation of the invention the terminals are not different but the invention does not exclude the possibility. Indeed, as described above a user is not restricted to one terminal but can make a request for communication from any available terminal, if permitted by the owner e.g. an originating user makes a communication request from a mobile telephone set and specifies the request to have a communication via his handfree telephone set on his desk. So, the terminals or a plurality of the terminals of the originating user may be the same but are not necessarily the same. The above paragraph is also valid for the terminating user.

A further feature of the present invention is that the retrieving and matching is performed either in a telecommunication network or in a terminal of the originating user or in a terminal of the terminating user. Each way to realize the step of retrieving and comparing has is own advantages which are described hereafter. Retrieving and comparing performed by:

a) a terminal of the originating user: the request profile of the originating user doesn't have to be transported;

b) a terminal of the terminating user: the reachability profile of the terminating user doesn't have to be transported;

c) the telecommunication network: no service device with extra logic required in the terminals.

It has to be remarked that also a combination of the different ways of implementation can be realized: including one or more service devices following the invention in the telecommunication network and providing some terminals with a service device following the invention. This way of dimensioning the telecommunication system provides a combination of the different advantages of each different way of implementation. The step of retrieving and matching is performed depending on the application and e.g. in order to transport as few profiles as possible.

Finally, an additional characteristic feature of the present invention is that the request profile of the originating user and reachability profile of the terminating user can include universal personal telecommunication features. By including these features not only the preferences of the terminating user of how an incoming UPT call should be treated but also the preferences of an originating user of how his UPT call request should be treated are taken into account. This means that a reachability profile of a terminating user is extended to UPT parameters which are involved to receive a universal personal telecommunication and that these parameters are set following service subscriptions and preferred services of the terminating user: e.g. a registration matrix as described above is extended to mention also the type of terminal whereto a UPT call could be routed. This means also that a request profile of an originating user is extended to UPT parameters which are involved to request a universal personal telecommunication and that these parameters are set following service subscriptions and preferred services of the originating user i.e. a request profile of an originating user includes e.g. a personal directory for originating calls, as described above, in order to be able to communicate with selected persons only, but includes also e.g. personal requirements of how his communication request has to be treated versus different reachability profiles. The two kinds of profiles are retrieved and compared with each other in order to find the most suitable UPT communication for both terminating and originating user.

It has to be remarked that although the characteristic feature of the previous paragraph is described in the context of a universal personal telecommunication system, it will be evident to any person skilled in the art that the invention is not restricted to such kind of telecommunication systems and that the present invention can be used in other kind of telecommunication systems such as e.g. mobile telecommunication systems and universal mobile telecommunication systems UMTS.

In the following paragraph a few examples are given to illustrate the advantages of retrieving and comparing of such extended profiles prior to connection set up;

in the event when a reachability profile of a terminating user specifies all his communications to be routed to his answering machine and in the event when the originating user prefers rather to have no communication instead of speaking with an answering machine, the originating user specifies in his request profile not to establish a communication in such a situation; and in the event when a reachability profile of a terminating user specifies only his fax machine to be available and in the event when the originating user prefers rather to have no communication instead of sending a fax, the originating user specifies in his request profile not to establish a fax communication in such a situation; and in the event when a reachability profile of a terminating user specifies that his communications are limited to voice-only communications and in the event when the originating user requests an audio-visual (video) communication but prefers rather to have a voice-only communication instead of no communication at all, the originating user specifies in his request as a second opportunity to establish a voice only communication in such a situation; and in the event when the terminating user, being e.g. an information service of identification numbers of users, uses different terminal numbers in order to provide his service in different languages and in the event when an originating user prefers to have his communications in a predetermined language, the originating user specifies in his request profile the predetermined language.

It has to be remarked that although in the claims and the following description of an embodiment the step of retrieving and comparing of a request profile of an originating user and a reachability profile of a terminating user is described, the present invention is not restricted to service devices wherein only one request profile and only one reachability profile are retrieved and compared. Indeed, in the event of e.g. a multipoint videoconference with a communication request of a central equipment which includes different identifications of different terminating users the service of the telecommunication system includes the step of retrieving and comparing the request profile of the originating user and the different reachability profiles of the different terminating users; and in the event of e.g. a conference call with different communication requests of different originating users willing to participate to the conference call at a predetermined time and which all include the identification of the central equipment the service of the invention includes the step of retrieving and comparing of different request profiles of different originating users and one reachability profile of one terminating user.

It has to be remarked that the above two examples do not exclude the possibility of retrieving and comparing a plurality of request profiles and a plurality of reachability profiles.

It is further to be noticed that when the term "including" is used in the claims, it should not be interpreted as being limiting to the means listed thereafter. Thus, the scope of the expression "a device including means A and means B" should not be limited to devices including only components A and B. In this regard, it means that with respect to the present invention, the only relevant components of the device are means A and means B and equivalents thereof.

Similarly, it is to be noted that the term "coupled", also used in the claims, should not be interpreted as being limiting to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means. Even more, it is noted that the path between an output of A and an input of B could be wired or could be wireless.

The above mentioned and other objects and features of the invention will become more apparent and the invention itself will be best understood by referring to the following description of an embodiment taken in conjunction with the accompanying drawing which represents a general functional block scheme of an embodiment of a telecommunication system including a service device according to the following invention.

BRIEF DESCRIPTION OF THE DRAWING

The functional blocks shown in the sole FIGURE of the drawing are functional blocks regarding to the invention. The global working of a telecommunication system goes beyond the scope of the invention and is therefore not described in detail. The aim is to describe the service device and the working and the use of the service device following the invention.

DETAILED DESCRIPTION OF PREFERRED EMBODIMENTS

The working of the service device will be explained by means of a functional description of the different blocks included in the service device as shown in the drawing. Based on this description, the practical implementation of the blocks will be evident for any person skilled in the art.

The telecommunication system includes a telecommunication network NETW, four terminals T1-A, T2-A, T3-A and T4-A of a user A, two terminals T1-B and T2-B of a user B, a system PROF-A which holds the user profile of user A, a system PROF-B which holds the user profile of user B and the service device SERV of the invention.

It should be remarked that the naming of terminals as distinct "first", "second", "third", etc. terminals is done to make it easy to follow in both the description and claims. Anyone of skill in the art will realize that some of the functions described for a particular terminal could as well be incorporated in another, regardless of location.

In this embodiment the telecommunication system is a universal personal telecommunication UPT network. As described above such a UPT network includes multiple networks.

A telecommunication network NETW as shown in the drawing is expected to fulfil at least the basic telecommunication requirements of a telecommunication system. It is not the purpose to describe here all the functions of a telecommunication network NETW, but regarding the invention it is worthwhile to mention the following basic functions:

handling overhead signals like e.g.:
forwarding a communication request REQ of a terminal e.g. T1-A of an originating user e.g. A to a service device SERV; and
receiving by call set up means which are included in the telecommunication network NETW of a call signal CS from a service device SERV; and
forwarding an information signal IS of a service device SERV to a terminal e.g. T1-A of an originating user e.g. A The call signal set up means are not shown in the drawing in order not to overload the FIGURE.
call establishing like e.g.:
upon receiving of a call signal CS at call signal set up means which are included in the telecommunication network NETW, the telecommunication network NETW establishes at a predetermined time a telecommunication following the information included in the call signal CS, e.g. establishing immediately a telecommunication TEL between terminal T2-A of user A and terminal T2-B of user B in order to have a communication between user A and user B.

It should be remarked that the means for sending the request (REQ) and for receiving the information signal (IS) could be incorporated in any terminal, such as any one or more of the four terminals shown of user A.

A telecommunication system also provides terminal independence which means that a user who is associated with a personal and unique number can make and receive a call on any terminal and at any location. The user wants to be able to communicate in the way chosen e.g. voice, fax, data or mail, etc. The FIGURE shows four terminals which are available on a predetermined location for user A and on a different location two terminals which are available for user B. Since in the example which will be described in a further paragraph in order to explain the working of the service of the invention three terminals will be used, only these three terminals will be defined more in detail:

T1-A: the first terminal of user A being a personal computer to handle e.g. E-mail messages;
T2-A: the second terminal of user A being a video telephone set; and
T1-B: the first terminal of user B being a mobile telephone; and
T2-B: the second terminal of user B being a video telephone set.

The terminal T1-A includes generating means to generate a communication request REQ and to provide this communication request REQ to the telecommunication network NETW. The generating means are not shown in the FIGURE. The terminal T1-A includes also information receiving means, also not shown in the FIGURE, in order to receive an information signal IS of the telecommunication network NETW.

The system PROF-A which holds the user profile of user A and the system PROF-B which holds the user profile of user B are databases which are located in a predetermined site of the telecommunication system.

Although this embodiment describes two different sites to store the profile of user A and the profile of user B, it has to be remarked that the invention is not restricted to telecommunication systems whereof each system which holds a user profile is located in a different site but that e.g. the system which holds user profile A and the system which holds user profile B can be integrated at the same site or that e.g. the site of a system which holds a user profile can be integrated in one of the terminals of the user.

A user profile includes a request profile and a reachability profile. Both kinds of profiles are including universal personal telecommunication features such as the features which are already described above and which reflects e.g. the preferences of the user regarding respectively originating and terminating communication.

In this embodiment and regarding the example which will be given in a further paragraph the request profile of user A includes the preference of having communications via his video telephone set T2-A and the reachability profile of user B includes the fact that user B has a video telephone set T2-B at his disposal and the preference of only having communications between nine and ten o'clock in the morning.

The service device SERV includes a retrieving and comparing means RC, a communication establishing means CE and an information generating means IF.

The retrieving and comparing means is included to retrieve a request profile or a reachability profile from the system PROF-A which holds the user profile of user A and the system PROF-B which holds the user profile of user B and to compare the request profiles with the reachability profiles following a predefined algorithm. This pre-defined algorithm compares:

the service subscriptions of both profiles e.g. the available type of terminals taken into account the allowed use of the terminals regarding charging and billing; and the preferred services of both profiles, e.g., the preferred type of terminal to have a communication for both users and the fact of this preferred type of terminal lines up for both users; or the preferred time to have a communication via the preferred type of terminal for both users and the fact of this preferred time lines up.

It has to be remarked that the comparing of the above mentioned algorithm is not restricted to the above mentioned parameters in the profile.

The retrieving and comparing means provides this service upon receiving of a communication request REQ of an originating user.

According to a result of the comparing the retrieving and comparing means RC provides a call result signal CRS to the communication establishing means CE whereby the call result signal CRS includes information regarding a communication which has to be set up. The communication establishing means CE provides upon receiving of a call result signal CRS a call signal CS to the call signal set up means of the telecommunication network NETW whereby the call signal CS includes the necessary information to instruct the call signal set up means to set up a communication following the information of the result of the comparing.

According to a result of the comparing the retrieving and comparing means RC provides an information result signal IRS to the information generating means IG. The information result signal IRS includes information regarding the result of the comparing which has to be provided to the originating user in order to give the originating user e.g. the possibility to adjust his communication request REQ or to drop the communication request REQ. This information is included in an information signal IS by the information generating means IG and provided via the telecommunication network NETW to information receiving means included in e.g. the first terminal T1-A of the original user A.

As already mentioned before an example is given in the following paragraph to explain the working of the service device SERV.

The originating user A generates at his T1-A terminal a communication request REQ and provides this communication request REQ at eight o'clock to the communication network NETW. The communication request REQ includes the identification of the terminating user B and specifies the requirement to have a communication as soon as possible and via his own preferred type of terminal with this user B.

The telecommunication network NETW provides this communication request REQ to the service device SERV of the invention. The retrieving and comparing means RC receives this communication request and starts retrieving the involved user profiles: the request profile of user A from the system PROF-A which holds the user profile of user A and the reachability profile of user B from the system PROF-B which holds the user profile of user B. The request profile of user A and the reachability profile of user B are compared with each other following the pre-defined algorithm.

Since the profile of user A specifies a video telephone set as his preferred type of terminal and since this type of terminal is available for user B but following the preferences of user B only between nine and ten o'clock, the result of the comparing is not that the requested communication can be established immediately, but, however a matching possibility exists i.e. "establishment of a communication at nine o'clock between terminal T2-A and the T2-B". An information result signal IRS including the result of the comparing is sent to the information generating means IG. The information generating means generates an information signal IS which includes the proposal of the above matching. When the user A receives the information signal IS at his terminal T1-A, user A decides to save the proposal of the services device SERV and launches his communication request REQ again at nine o'clock whereby a communication is established between user A and user B via their video telephone sets, respectively, T2-A and T2-B. The established communication is shown in the drawing with a dotted bold double arrow line.

It has to be understood that the features of a possible communication establishment e.g. time, users and involved terminals could be saved in memory means in order to provide automatically at the right time a call signal CS to call signal set up means of the telecommunication network NETW. the memory means could be included either in the service device SERV, in the telecommunication network NETW or in one of the terminals.

It also has to be remarked that although in the given example to explain the working of the service device SERV, user A is the originating user and user B is the terminating user, the invention is not restricted to terminals which fulfil only an originating role or only a terminating role. To any person skilled in the art it will be evident that a terminal fulfills as well the originating role as the terminating role, as long as the required functional blocks of originating role and terminating role are included in the terminal.

Yet, another remark is that although the described telecommunication system in the embodiment is a universal personal telecommunication system, it will be evident to any person skilled in the art that the invention is not restricted to such kinds of telecommunication systems and that the present invention can be used in other kind of telecommunication systems such as, e.g., mobile telecommunication systems and universal mobile telecommunication systems UMTS.

While the principles of the invention have been described above in connection with specific apparatus, it is to be clearly understood that this description is made only by way of example and not as a limitation on the scope of the invention.

What is claimed is:

1. A service supported within a telecommunication system which is delivered upon receiving of a communication request (REQ) of an originating user (A), said communication request (REQ) being generated at a first terminal (T1-A) of said originating user (A) and including an identification of a terminating user (B), characterized in that said service includes retrieving and comparing a request profile of said originating user and a reachability profile of said terminating user without automatically performing a subsequent step of allocating bandwidth for a connection to the terminating user (B) if the terminating user (B) is reachable.

2. The service according to claim 1, characterized in that said service further includes any or both of the steps of:
   a) according to a result of said comparing, establishing a communication between a second terminal (T2-A) of said originating user and first terminal (T2-B) of said terminating user; and
   b) generating and providing information of said result to a third terminal (T1-A) of said originating user or to a second terminal of said terminating user.

3. The service according to claim 1, characterized in that said comparing is performed by a fourth terminal of said originating user.

4. The service according to claim 1, characterized in that said comparing is performed by a third terminal of said terminating user.

5. The service according to claim 1, characterized in that said comparing is performed by comparing means included in a telecommunication network which is included in said telecommunication system.

6. The service according to claim 1, characterized in that said telecommunication system is an universal personal telecommunication network and that said request profile and said reachability profile include universal personal telecommunication features.

7. A service device (SERV) included in a telecommunication system to deliver a service within said telecommunication system upon receiving of a communication request (REQ) of an originating user (A), said communication request (REQ) being generating at a first terminal (T1-A) of said originating user (A) and being provided via a telecommunication network (NETW) to said service device (SERV), said first terminal (T1-A) and said telecommunication network (NETW) being included in said telecommunication system and said communication request (REQ) including an identification of a terminating user (B), characterized in that said service device (SERV) includes retrieving and comparing means (RC) to retrieve and to compare a request profile of said originating user and a reachability profile of said terminating user without automatically performing a subsequent step of allocating bandwidth for a connection to the terminating user (B) if the terminating user (B) is reachable.

8. The service device (SERV) according to claim 7, characterized in that said service device (SERV) further includes communication establishing means (CE) included to generate a call signal (CS) upon receiving of a call result signal (CRS) of said retrieving and comparing means (RC), said call signal (CS) being provided to call signal set up means included in said telecommunication network (NETW) in order to establish a communication according to said call result signal (CRS) between a second terminal (T2-A) of said originating user (A) and a first terminal (T2-B) of said terminating user (B) via said telecommunication network (NETW), said second terminal (T2-A) of said originating user (A) and said first terminal (T2-B) of said terminating user (B) being included in said telecommunication system.

9. The service device (SERV) according to claim 7, characterized in that said service device (SERV) further includes information generating means (IG) included to generate an information signal (IS) upon receiving of an information result signal (IRS) of said retrieving and comparing means (RC), said information signal (IS) being provided to information receiving means included in a third terminal (T1-A) of said originating user (A) which is included in said telecommunication system and coupled to said telecommunication network (NETW).

10. The service device (SERV) according to claim 7, characterized in that said service device (SERV) is included in a fourth terminal of said originating user (A), said fourth terminal of said originating user (A) being included in said telecommunication system and being coupled to said telecommunication network (NETW).

11. The service device (SERV) according to claim 7, characterized in that said service device (SERV) is included in a second terminal of said terminating user (B), said second terminal of said terminating user (B) being included in said telecommunication system and being coupled to said telecommunication network (NETW).

12. The service device (SERV) according to claim 7, characterized in that said service device (SERV) is included in said telecommunication network (NETW).

13. The service device (SERV) according to claim 7, characterized in that said telecommunication system is an universal personal telecommunication network and that said request profile and said reachability profile include universal personal telecommunication features.

14. A telecommunication system characterized in that said telecommunication system includes at least one service device (SERV) as described in claim 7.

15. The service according to claim 1, characterized in that said service further includes the step of generating and providing information of said result to a fifth terminal (T1-A) of said originating user in order to tune said request profile to said reachability profile.

16. The service according to claim 1, characterized in that said service further includes the step of generating and providing information of said result to a sixth terminal (T1-A) of said originating user in order to design a common request profile and a common reachability profile.

* * * * *

UNITED STATES PATENT AND TRADEMARK OFFICE
CERTIFICATE OF CORRECTION

PATENT NO. : 6,226,519 B1
DATED : May 1, 2001
INVENTOR(S) : Van Doorselaer et al.

It is certified that error appears in the above-identified patent and that said Letters Patent is hereby corrected as shown below:

<u>Title page,</u>
Item [57] ABSTRACT, line 13, please insert -- a -- prior to "first".

<u>Column 10,</u>
Line 60, (claim 2, line 5), please insert -- a -- prior to "first".

Signed and Sealed this

Thirteenth Day of November, 2001

Attest:

*Nicholas P. Godici*

NICHOLAS P. GODICI
*Attesting Officer*     *Acting Director of the United States Patent and Trademark Office*